US012738655B1

(12) United States Patent
Tanabe et al.

(10) Patent No.: US 12,738,655 B1
(45) Date of Patent: Sep. 15, 2026

(54) ANTENNA MODULE

(71) Applicant: Murata Manufacturing Co., Ltd., Nagaokakyo (JP)

(72) Inventors: Toumu Tanabe, Nagaokakyo (JP); Shinya Tachibana, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 48 days.

(21) Appl. No.: 18/679,630

(22) Filed: May 31, 2024

Related U.S. Application Data

(63) Continuation of application No. PCT/JP2022/044158, filed on Nov. 30, 2022.

(30) Foreign Application Priority Data

Dec. 22, 2021 (JP) ................................ 2021-207801

(51) Int. Cl.
*H01Q 9/04* (2006.01)
*H01Q 9/30* (2006.01)

(52) U.S. Cl.
CPC ............ *H01Q 9/0414* (2013.01); *H01Q 9/30* (2013.01)

(58) Field of Classification Search
CPC ............................... H01Q 9/0414; H01Q 9/30
See application file for complete search history.

(56) References Cited

U.S. PATENT DOCUMENTS 8,531,252 B2 * 9/2013 Nakamura ........... H04B 1/0057 333/132
10,468,770 B2 * 11/2019 Puente Baliarda .. H01Q 1/3275
2009/0009401 A1 * 1/2009 Suzuki .................. H01Q 21/28 343/700 MS
2010/0079349 A1 * 4/2010 Wang .................... H01Q 5/392 343/700 MS (Continued)

FOREIGN PATENT DOCUMENTS

JP 2009159291 A 7/2009
JP 2011061712 A 3/2011

(Continued)

OTHER PUBLICATIONS

International Search Report in PCT/JP2022/044158, mailed Feb. 21, 2023, 3 pages.

(Continued)

*Primary Examiner* — Dameon E Levi
*Assistant Examiner* — Jordan E. DeWitt
(74) *Attorney, Agent, or Firm* — Keating & Bennett, LLP

(57) ABSTRACT

An antenna module includes a first antenna device with a first resonant frequency, a second antenna device with a second resonant frequency, and a pass filter connected between a predetermined position in the second antenna device and the ground. The first antenna device includes a first radiating element connected to a first feed circuit. The second antenna device includes a second radiating element connected to a second feed circuit. The pass filter blocks the second resonant frequency and the first and second radiating (Continued)

elements are coupled to each other by at least one of an electric field or a magnetic field, so that the pass filter passes a third resonant frequency of a parasitic antenna functioning on a path from the ground through the pass filter and then through the first radiating element.

15 Claims, 3 Drawing Sheets

(56) References Cited

U.S. PATENT DOCUMENTS

2010/0157860 A1* 6/2010 Hagiwara ............ H04B 1/0057 370/310
2010/0302106 A1* 12/2010 Knudsen .............. H01Q 19/005 343/702
2011/0140982 A1* 6/2011 Ozden .................... H01Q 1/521 343/852
2011/0175789 A1* 7/2011 Lee ........................ H01Q 1/243 333/17.1
2012/0139812 A1* 6/2012 Ito .......................... H01Q 21/28 343/853
2012/0146865 A1 6/2012 Hayashi et al.
2013/0050057 A1* 2/2013 Hayashi ................... H01Q 1/38 343/893
2015/0147980 A1 5/2015 Larsen et al.
2017/0093554 A1* 3/2017 Ebihara ................. H04L 5/1461
2018/0159220 A1* 6/2018 Kuroda .................... H01Q 9/42
2020/0153098 A1* 5/2020 Onaka .................... H01Q 1/421
2020/0295464 A1* 9/2020 Komura ................. H01Q 15/24
2021/0066795 A1* 3/2021 Flores-Cuadras .... H01Q 9/0407
2021/0239791 A1* 8/2021 Vollbracht ............ G01S 13/931
2021/0320418 A1* 10/2021 Tachibana ................ H01Q 5/40
2022/0181766 A1* 6/2022 Mori ...................... H01Q 5/378
2023/0093847 A1* 3/2023 Chen ...................... H04B 1/006 370/277
2024/0387993 A1* 11/2024 Tanabe ..................... H01Q 7/00
2025/0055486 A1* 2/2025 Moon .................. H04B 1/0064
2026/0095200 A1* 4/2026 Horita ...................... H04B 1/10

FOREIGN PATENT DOCUMENTS

JP 5692086 B2 4/2015
JP 2017501619 A 1/2017
WO 2009082175 A2 7/2009

OTHER PUBLICATIONS

Written Opinion in PCT/JP2022/044158, mailed Feb. 21, 2023, 3 pages.

* cited by examiner

ANTENNA MODULE

CROSS REFERENCE TO RELATED APPLICATIONS

This application claims the benefit of priority to Japanese Patent Application No. 2021-207801 filed on Dec. 22, 2021 and is a Continuation Application of PCT Application No. PCT/JP2022/044158 filed on Nov. 30, 2022. The entire contents of each application are hereby incorporated herein by reference.

BACKGROUND OF THE INVENTION

1. Field of the Invention

The present disclosure relates to antenna modules, and, more particularly, to techniques for broadening a usable frequency band without increasing the number of antennas in a narrow area.

2. Description of the Related Art

Examples of the techniques for broadening a usable frequency band include the antenna device disclosed in Japanese Unexamined Patent Application Publication No. 2009-159291. The antenna device disclosed in Japanese Unexamined Patent Application Publication No. 2009-159291 broadens a usable frequency band by coupling a feeding antenna and a parasitic antenna.

SUMMARY OF THE INVENTION

The antenna device disclosed in Japanese Unexamined Patent Application Publication No. 2009-159291 broadens a usable frequency band. However, there is a demand to broaden a frequency band for a small communication device by disposing another antenna in an antenna area. However, the antenna area of a small communication device is limited. The close proximity of a plurality of antennas causes the deterioration of isolation that cannot be ignored. This may lead to the deterioration of communication performance. To prevent the deterioration of communication performance, another antenna needs to be placed apart from the antenna device disclosed in Patent Document 1. Thus, the antenna device disclosed in Japanese Unexamined Patent Application Publication No. 2009-159291 is not suitable for broadening a frequency band by disposing another antenna in a narrow antenna area.

Example embodiments of the present invention broaden a frequency band without increasing the number of antennas in a narrow antenna area.

An antenna module according to an example embodiment of the present disclosure includes a first antenna device with a first resonant frequency, a second antenna device with a second resonant frequency, and a pass filter connected between a predetermined position in the second antenna device and a ground. The first antenna device includes a first radiating element connected to a first feed circuit. The second antenna device includes a second radiating element connected to a second feed circuit. The pass filter blocks the second resonant frequency and the first radiating element and the second radiating element are coupled to each other by at least one of an electric field or a magnetic field, so that the pass filter passes a third resonant frequency of a parasitic antenna functioning on a path from the ground through the pass filter and then through the second radiating element.

In the antenna modules according to example embodiments of the present disclosure, a band corresponding to the third frequency of the parasitic antenna is added to a first antenna device. Accordingly, a frequency band can be broadened without increasing the number of antennas in a narrow antenna area.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
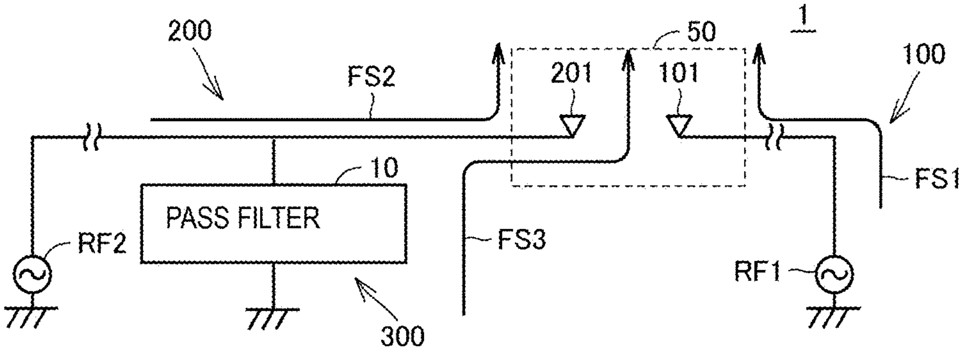
FIG. 1 is a diagram illustrating the configuration of an antenna module according to a first example embodiment of the present invention.

Example embodiments of the present disclosure will be described in detail below with reference to drawings. The same reference numeral is used to represent the same element or feature or a corresponding element or feature in the drawings, and the description thereof will not be repeated.

In the present disclosure, radiation efficiency represents the ratio of an output to power supplied from a feed circuit. That is, the efficiency with respect to power supplied from the feed circuit is obtained in consideration of a loss in a circuit or a loss due to mismatching.

First Example Embodiment

Basic Configuration of Antenna Module

FIG. 1 is a diagram illustrating the configuration of an antenna module 1 according to the first example embodiment. The antenna module 1 includes a first antenna device 100 and a second antenna device 200. The first antenna device 100 includes a feed circuit RF1 and a radiating element 101. The second antenna device 200 includes a feed circuit RF2, a radiating element 201, and a pass filter 10.

The antenna module 1 is installed in, for example, a mobile terminal, such as a cellular phone, a smartphone, or a tablet computer, or a communication apparatus, such as a personal computer with a communication function. The first antenna device 100 is, for example, a monopole antenna. The second antenna device 200 is, for example, a monopole antenna.

The feed circuit RF1 supplies a radio frequency signal FS1 in a frequency band in an f1 band to the radiating element 101. The radiating element 101 can radiate the radio frequency signal FS1 in the f1 band supplied from the feed circuit RF1 into air as radio waves. The frequency band in the f1 band includes, for example, n77 (3.3-4.2 GHZ), n78 (3.3-3.8 GHZ), and n79 (4.4-5.0 GHz) in 5G-NR (New Radio).

The feed circuit RF2 supplies a radio frequency signal FS2 in a frequency band in an f2 band to the radiating element 201. The radiating element 201 can radiate the radio frequency signal FS2 in the f2 band supplied from the feed circuit RF2 into air as radio waves. The frequency band in the f2 band includes, for example, n41 (2.5-2.7 GHZ).

The pass filter 10 is connected between the radiating element 201 and the ground. The pass filter 10 is a band pass filter configured to pass a radio frequency signal in a specific frequency band and block or attenuate a radio frequency signal in the other frequency bands. The pass filter 10 is configured to block or attenuate the radio frequency signal FS2 in the frequency band in the f2 band.

Figure 6:
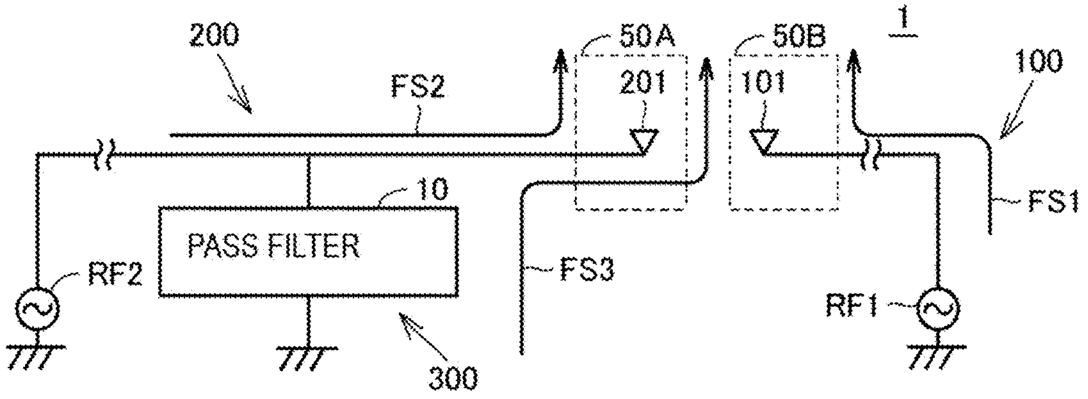
FIG. 6 is a diagram illustrating the configuration of an antenna module according to a modification of the first example embodiment of the present invention.

The radiating elements 101 and 201 are mounted on the same substrate 50. The radiating elements 101 and 201 are provided on the same substrate 50, but, as shown in FIG. 6, may be provided on different substrates 50A and 50B on condition that they are provided in the same antenna module 1.

The radiating elements 101 and 201 are coupled to each other by at least one of an electric field or a magnetic field. The pass filter 10 is disposed between the radiating element 201 and the ground. The path from the ground through the pass filter 10 and then through the radiating element 201 excites to function as a parasitic antenna 300. The parasitic antenna 300 can transmit and receive a radio frequency signal FS3 in an f3 band.

The pass filter 10 passes the radio frequency signal FS3 in a frequency band in the f3 band. The frequency band in the f3 band of the parasitic antenna 300 is therefore added to the radiating element 101. The pass filter 10 has been described as being a band pass filter configured to pass a radio frequency signal in a specific frequency band and block or attenuate a radio frequency signal in the other frequency bands, but may be a high pass filter configured to block a signal in a band lower than or equal to a specific frequency and pass a signal in a band higher than the specific frequency when the f3 frequency band is higher than the f2 frequency band.

The pass filter 10 may pass the radio frequency signal FS1 in the frequency band in the f1 band. When the f3 band and the f1 band are close to each other, the effect of resonance of the parasitic antenna in the f3 band may also be exerted on the f1 band and radiation efficiency may also be improved in the f1 band.

Figure 2:
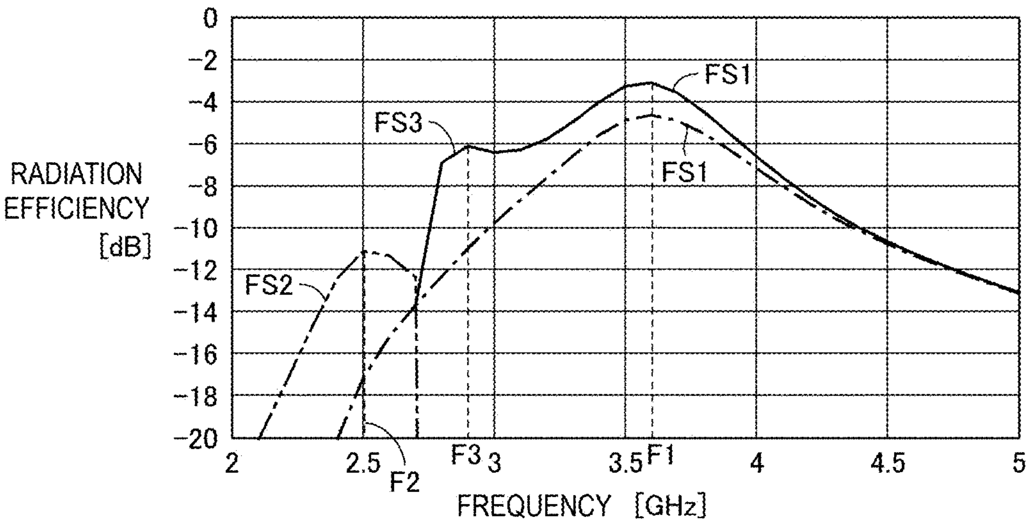
FIG. 2 is a diagram illustrating exemplary radiation efficiency of the antenna module according to the first example embodiment of the present invention.

FIG. 2 is a diagram illustrating exemplary radiation efficiency of the antenna module 1 according to the first example embodiment. In FIG. 2, the horizontal axis represents frequency [GHz] and the vertical axis represents radiation efficiency [dB]. The radiation efficiency of the radiating element 201 is represented by a waveform represented by a dash-dot-dot line. The radiation efficiency of the radiating element 101 before the insertion of the pass filter 10 is represented by a waveform represented by a dash-dot line. The radiation efficiency of the radiating element 101 after the insertion of the pass filter 10 is represented by a waveform represented by a solid line on the upper side of the dash-dot line.

As illustrated in FIG. 2, a resonant frequency F2 of the radio frequency signal FS2 supplied from the feed circuit RF2 is the lowest and a resonant frequency F1 of the radio frequency signal FS1 supplied from the feed circuit RF1 is the highest. A resonant frequency F3 of the radio frequency signal FS3 supplied from the parasitic antenna 300 is located between the resonant frequency F2 and the resonant frequency F1. The resonant frequency F1 is the fundamental frequency of the radiating element 101 connected to the feed circuit RF1. The resonant frequency F2 is the fundamental frequency of the radiating element 201 connected to the feed circuit RF2.

As illustrated in FIG. 2, the insertion of the pass filter 10 improves the radiation efficiency of the first antenna device 100 in the f3 band including the resonant frequency F3 under the influence of the parasitic antenna 300. The pass filter 10 has filter characteristics in which it passes the frequency bands in the f1 and f3 bands and blocks or attenuates the frequency band in the f2 band. Causing the pass filter 10 to have characteristics in which it also passes the f1 band also improves the radiation efficiency in the f1 band including the resonant frequency F1. Thus, in the antenna module 1, the path from the ground through the pass filter 10 and then through the radiating element 201 functions as the parasitic antenna 300. A frequency band can therefore be broadened without increasing the number of antennas in a narrow antenna area.

Second Example Embodiment

Basic Configuration of Antenna Module

Figure 3:
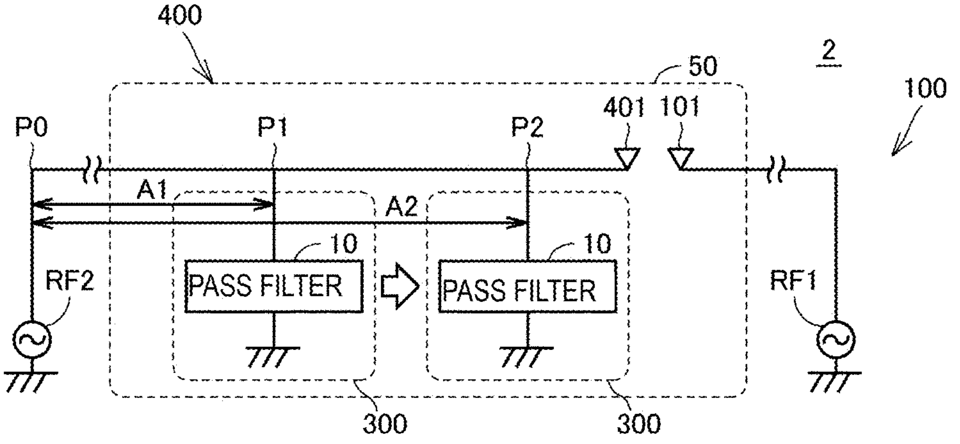
FIG. 3 is a diagram illustrating the configuration of an antenna module according to a second example embodiment of the present invention.

FIG. 3 is a diagram illustrating the configuration of an antenna module 2 according to a second example embodiment. The antenna module 2 includes the first antenna device 100 and a second antenna device 400. The first antenna device 100 includes the feed circuit RF1 and the radiating element 101. The second antenna device 400 includes the feed circuit RF2, a radiating element 401, and the pass filter 10.

The antenna module 2 is installed in, for example, a mobile terminal, such as a cellular phone, a smartphone, or a tablet computer, or a communication apparatus, such as a personal computer with a communication function. The first antenna device 100 is, for example, a monopole antenna. The second antenna device 400 is, for example, a monopole antenna.

The radiating elements 101 and 401 are mounted on the same substrate 50. The radiating elements 101 and 401 are provided on the same substrate 50, but may be provided on different substrates on condition that they are provided in the same antenna module 2.

The radiating elements 101 and 401 are coupled to each other by at least one of an electric field or a magnetic field. The pass filter 10 is disposed between the radiating element 401 and the ground. The path from the ground through the pass filter 10 and then through the radiating element 401 excites to function as the parasitic antenna 300. The parasitic antenna 300 can transmit and receive the radio frequency signal FS3 in the f3 band.

The pass filter 10 is connected between the ground and a position P1 or P2 that is a predetermined position in the radiating element 401. The pass filter 10 has filter characteristics in which it passes the frequency bands in the f1 and f3 bands and blocks or attenuates the frequency band in the f2 band. The pass filter 10 has, for example, filter characteristics in which it attenuates a frequency band lower than or equal to 2.7 GHz and passes a frequency band higher than 2.7 GHZ.

The distance between a connection point P0 that is a point of connection to the feed circuit RF2 and the position P1 is A1, and the distance between the connection point P0 that is the point of connection to the feed circuit RF2 and the position P2 is A2. For example, a short-circuiting pin for connection to the ground may be disposed at the position P1 or P2. The pass filter 10 may be disposed at another position in the radiating element 401.

Thus, in the antenna module 2, the position of a frequency band desired to be broadened can be changed without changing the length of the radiating element 401 by changing the position of the pass filter 10. The change in frequency band with the change in the position of the pass filter 10 will be described in detail with reference to FIG. 4.

Figure 4:
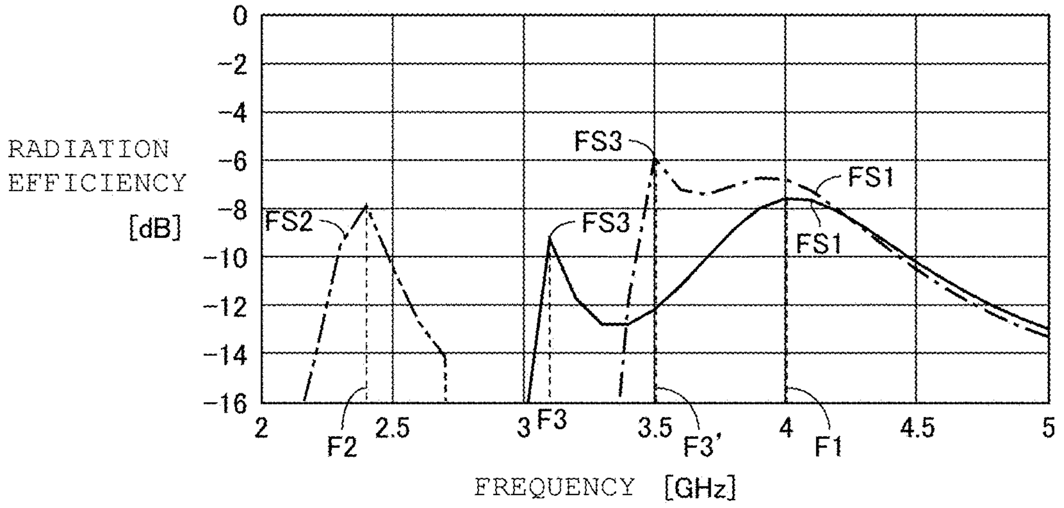
FIG. 4 is a diagram illustrating exemplary radiation efficiency of the antenna module according to the second example embodiment of the present invention.

FIG. 4 is a diagram illustrating exemplary radiation efficiency of the antenna module 2 according to the second example embodiment. In FIG. 4, the horizontal axis represents frequency [GHz] and the vertical axis represents radiation efficiency [dB]. The radiation efficiency of the radiating element 401 is represented by a waveform represented by a dash-dot-dot line. The radiation efficiency of the radiating element 101 when the pass filter 10 is connected to the position P1 is represented by a waveform represented by a solid line on the right side of the graph. The radiation efficiency of the radiating element 101 when the pass filter 10 is connected to the position P2 is represented by a waveform represented by a dash-dot line on the right side of the graph.

As illustrated in FIG. 4, the resonant frequency F2 of the radio frequency signal FS2 supplied from the feed circuit RF2 is the lowest and the resonant frequency F1 of the radio frequency signal FS1 supplied from the feed circuit RF1 is the highest. The resonant frequency F3 or a resonant frequency F3' of the radio frequency signal FS3 supplied from the parasitic antenna 300 is located between the resonant frequency F2 and the resonant frequency F1. The resonant frequency F1 is the fundamental frequency of the radiating element 101 connected to the feed circuit RF1. The resonant frequency F2 is the fundamental frequency of the radiating element 201 connected to the feed circuit RF2.

As illustrated in FIG. 4, the radiation efficiency in the f3 band including the resonant frequency F3 improves under the influence of the parasitic antenna 300 caused by the pass filter 10 at the position P1. When there is a need to change the position of a frequency band required to be broadened, for example, the position of the pass filter 10 may be changed from the position P1 to the position P2. The change in the distance from the connection point P0, which is the point of connection to the feed circuit RF2, from the distance A1 to the distance A2 therefore makes the pass filter 10 closer to the end portion of the radiating element 401. The radiation efficiency in an f3' band including the resonant frequency F3' improves under the influence of the parasitic antenna 300 caused by the pass filter 10 at the position of the distance A2.

Thus, in the antenna module 2, the position of a frequency band required to be broadened can be changed without changing the length of the radiating element 401, that is, without changing the f2 band, by changing the position of the pass filter 10. For example, the position of a frequency band required to be broadened can be made closer to the resonant frequency F1 by making the position of the pass filter 10 closer to the end portion of the radiating element 401 as illustrated in FIG. 4.

In an actual antenna module, a feed circuit and a wiring line extending from the feed circuit are present as a portion of a radiating element on a substrate and another radiating element is present which is different from the radiating element connected to the wiring line on the substrate. A pass filter may be connected to the radiating element that is the wiring line on the substrate or another radiating element different from the radiating element on the substrate.

Third Example Embodiment

Basic Configuration of Antenna Module

Figure 5:
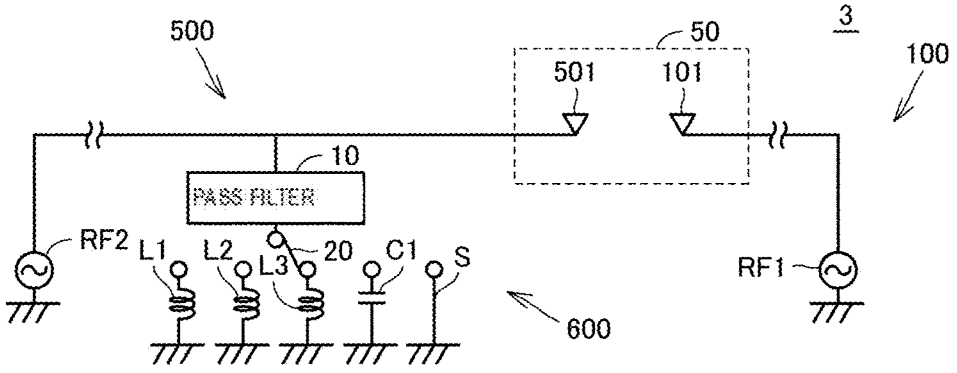
FIG. 5 is a diagram illustrating the configuration of an antenna module according to a third example embodiment of the present invention.

FIG. 5 is a diagram illustrating the configuration of an antenna module 3 according to a third example embodiment. The antenna module 3 includes the first antenna device 100 and a second antenna device 500. The first antenna device 100 includes the feed circuit RF1 and the radiating element 101. The second antenna device 500 includes the feed circuit RF2, a radiating element 501, the pass filter 10, a switch 20, and frequency adjustment elements of a plurality of types connectable to the switch 20.

The antenna module 3 is installed in, for example, a mobile terminal, such as a cellular phone, a smartphone, or a tablet computer, or a communication apparatus, such as a personal computer with a communication function. The first antenna device 100 is, for example, a monopole antenna. The second antenna device 500 is, for example, a monopole antenna.

The radiating elements 101 and 501 are mounted on the same substrate 50. The radiating elements 101 and 501 are provided on the same substrate 50, but may be provided on different substrates on condition that they are provided in the same antenna module 3.

The radiating elements 101 and 501 are coupled to each other by at least one of an electric field or a magnetic field. The pass filter 10 is disposed between the radiating element 501 and the ground. The path from the ground through any one of the frequency adjustment elements of the multiple types, the pass filter 10, and then through the radiating element 501 excites to function as a parasitic antenna 600. The radio frequency signal FS3 in the f3 band is supplied from the parasitic antenna 600.

The frequency adjustment elements of the multiple types include inductors L1, L2, and L3 and a capacitor C1. Each of the inductors L1, L2, and L3 and the capacitor C1 has one end connectable to the pass filter 10 via the switch 20 and the other end at a position connected to the ground. The number of inductors and the number of capacitors can be changed as appropriate. The positions of the inductors and the capacitor may be between the pass filter 10 and the radiating element 501.

The switch 20 performs frequency conversion by switching between points of connections between a short path S and the frequency adjustment elements of the multiple types. By connecting the inductor from the state of 0Ω in which no inductor is connected, an f3 frequency band can be reduced from a frequency at the state of 0Ω. In a region lower than the frequency at the state of 0Ω, the inductor can reduce the f3 frequency with the increase in an inductance value and increase the f3 frequency with the decrease in an inductance value.

In contrast, by connecting the capacitor from the state of 0Ω in which no capacitor is connected, the f3 frequency can be increased from a frequency at the state of 0Ω. In a region higher than the frequency at the state of 0Ω, the capacitor can reduce the f3 frequency with the increase in a capacitance value and increase the f3 frequency with the decrease in a capacitance value. The pass filter 10 may be designed to pass frequencies that have been able to pass these frequency adjustment elements.

Thus, in the antenna module 3, the position of a frequency band required to be broadened can be changed by frequency conversion performed by switching between connections to the frequency adjustment elements of the multiple types.

The switch 20 does not necessarily have to be disposed. Frequency adjustment may be performed with an inductor or a capacitor after a mount electrode provided to mount a component on a substrate has been disposed between the pass filter 10 and the ground and an antenna module has been incorporated into a communication terminal or a mobile terminal.

Although the case has been described in the respective example embodiments in which an antenna device is a monopole antenna, the antenna device may be another antenna such as an inverted-F antenna.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna module comprising:

a first antenna device with a first resonant frequency;

a second antenna device with a second resonant frequency; and a pass filter connected between a predetermined position in the second antenna device and a ground; wherein the first antenna device includes a first radiating element connected to a first feed circuit;

the second antenna device includes a second radiating element connected to a second feed circuit;

the pass filter blocks the second resonant frequency and the first radiating element and the second radiating element are coupled to each other by at least one of an electric field or a magnetic field, so that the pass filter passes a third resonant frequency of a parasitic antenna functioning on a path from the ground through the pass filter and then through the second radiating element;

the first resonant frequency is higher than the second resonant frequency; and the third resonant frequency is located between the first resonant frequency and the second resonant frequency.

2. The antenna module according to claim 1, wherein the second resonant frequency is a fundamental frequency of the second radiating element connected to the second feed circuit.

3. The antenna module according to claim 1, wherein the pass filter passes the first resonant frequency.

4. The antenna module according to claim 1, wherein the pass filter is either a high pass filter or a band pass filter.

5. The antenna module according to claim 1, wherein a switch and frequency adjustment elements of a plurality of types are provided between the pass filter and the ground; and the switch is capable of performing frequency conversion by switching between points of connections to the frequency adjustment elements of the plurality of types.

6. The antenna module according to claim 1, wherein the first antenna device is a monopole antenna.

7. The antenna module according to claim 1, wherein the second antenna device is a monopole antenna.

8. The antenna module according to claim 1, wherein the first radiating element radiates a radio frequency signal in a first band including n77 (3.3-4.2 GHZ), n78 (3.3-3.8 GHz), and n79 (4.4-5.0 GHz) in 5G-NR (New Radio).

9. The antenna module according to claim 1, wherein the second radiating element radiates a radio frequency signal in a second band including n41 (2.5-2.7 GHz).

10. The antenna module according to claim 1, wherein the first radiating element and the second radiating element are provided on a same substrate.

11. The antenna module according to claim 1, wherein the first radiating element and the second radiating element are provided on different substrates.

12. The antenna module according to claim 1, wherein the first antenna device is an inverted-F antenna.

13. The antenna module according to claim 1, wherein the second antenna device is an inverted-F antenna.

14. An apparatus comprising the antenna module according to claim 1.

15. The apparatus according to claim 14, wherein the apparatus is a mobile terminal, a computer, or a communication apparatus.

* * * * *